United States Patent
Sato et al.

(10) Patent No.: US 10,664,729 B2
(45) Date of Patent: May 26, 2020

(54) CONSUMABLES MANAGEMENT SYSTEM AND CONSUMABLES MANAGEMENT DEVICE

(71) Applicant: FUJI XEROX CO., LTD., Tokyo (JP)

(72) Inventors: Mitsuru Sato, Kanagawa (JP); Noriyuki Suzumura, Kanagawa (JP); Kosuke Kubota, Kanagawa (JP); Hosana Kimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/815,714

(22) Filed: Nov. 17, 2017

(65) Prior Publication Data

US 2018/0276511 A1 Sep. 27, 2018

(30) Foreign Application Priority Data

Mar. 23, 2017 (JP) ................. 2017-057643

(51) Int. Cl.
*G06K 15/02* (2006.01)
*G06F 3/12* (2006.01)
*G06Q 10/08* (2012.01)
*G06K 15/00* (2006.01)

(52) U.S. Cl.
CPC ....... *G06K 15/007* (2013.01); *G06K 15/4065* (2013.01); *G06K 15/4075* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 2003/0202202 A1* | 10/2003 | Miyata | ............. | B41J 11/0075 358/1.14 |
| 2005/0275867 A1* | 12/2005 | Higashiura | ............ | G06K 15/00 358/1.14 |
| 2005/0275868 A1* | 12/2005 | Higashiura | ............ | G06K 15/00 358/1.14 |
| 2007/0071462 A1* | 3/2007 | Koitabashi | ............. | G06F 3/121 399/23 |

(Continued)

FOREIGN PATENT DOCUMENTS

JP 2002279095 9/2002

*Primary Examiner* — Beniyam Menberu
(74) *Attorney, Agent, or Firm* — JCIPRNET

(57) ABSTRACT

A consumables management system includes: a service providing device side communication unit that performs communication relevant to consumption information of a consumable item with a mobile device present within a communication area set in advance corresponding to a service providing device; a mobile device side communication unit that is mounted in the mobile device and performs communication relevant to the consumption information with the service providing device side communication unit in a case where the mobile device is present within the communication area; and a notification unit that notifies an administrator possessing the mobile device that a remaining amount of the consumable item mounted in the service providing device has been reduced to a predetermined threshold remaining amount or less in a case where it is determined that the remaining amount of the consumable item has been reduced to the threshold remaining amount or less.

8 Claims, 17 Drawing Sheets

(56) References Cited

U.S. PATENT DOCUMENTS

| | | | |
|---|---|---|---|
| 2011/0158659 A1* | 6/2011 | Tarao | G03G 15/5016 |
| | | | 399/8 |
| 2012/0221901 A1* | 8/2012 | Tanaka | G06F 11/0709 |
| | | | 714/57 |
| 2014/0023383 A1* | 1/2014 | Kogusuri | G03G 15/553 |
| | | | 399/8 |
| 2014/0085675 A1* | 3/2014 | Watanabe | H04N 1/00233 |
| | | | 358/1.15 |
| 2015/0212773 A1* | 7/2015 | Thijssen | G06Q 10/06 |
| | | | 358/1.15 |
| 2016/0065764 A1* | 3/2016 | Kang | H04N 1/00 |
| | | | 358/1.13 |
| 2017/0038923 A1* | 2/2017 | Tsuzuki | G06F 3/0482 |
| 2017/0087883 A1* | 3/2017 | Matsui | B41J 29/46 |
| 2017/0223127 A1* | 8/2017 | Matsutani | H04L 67/26 |
| 2017/0251124 A1* | 8/2017 | Yasui | H04N 1/32122 |
| 2017/0345080 A1* | 11/2017 | Asai | G06Q 10/083 |

\* cited by examiner

FIG. 2

ADMINISTRATOR TABLE

| ADMINISTRATOR NUMBER j | ADMINISTRATOR ID |
|---|---|
| 1 | ADMINISTRATOR A |
| 2 | ADMINISTRATOR B |
| 3 | ADMINISTRATOR C |

FIG. 3

CONSUMABLES TABLE

| CONSUMABLE ITEM NUMBER i | CONSUMABLE ITEM | REMAINING AMOUNT | CONSUMPTION SPEED | 5% INTENTION | 3% INTENTION |
|---|---|---|---|---|---|
| 1 | TRAY A | 90% | ○○ MINUTES/1% | | |
| 2 | TRAY B | 75% | ○△ MINUTES/1% | | |
| 3 | TRAY C | 2% | ○× MINUTES/1% | 1 | 1 |
| 4 | TRAY D | 60% | ×○ MINUTES/1% | | |
| 5 | Y TONER | 95% | ×△ MINUTES/1% | | |
| 6 | M TONER | 40% | ×× MINUTES/1% | | |
| 7 | C TONER | 55% | △△ MINUTES/1% | | |
| 8 | K TONER | 4% | △× MINUTES/1% | 1 | |
| 9 | STAPLE NEEDLE | 70% | △○ MINUTES/1% | | |

FIG. 4

NOTIFICATION COMPLETION TABLE

| CONSUMABLE ITEM NUMBER i | CONSUMABLE ITEM | j = 1: ADMINISTRATOR A | | | j = 2: ADMINISTRATOR B | | | j = 3: ADMINISTRATOR C | | |
|---|---|---|---|---|---|---|---|---|---|---|
| | | 5% | 3% | 1% | 5% | 3% | 1% | 5% | 3% | 1% |
| 1 | TRAY A | | | | | | | | | |
| 2 | TRAY B | | | | | | | | | |
| 3 | TRAY C | 1 | | | 1 | 1 | | | | |
| 4 | TRAY D | | | | | | | | | |
| 5 | Y TONER | | | | | | | | | |
| 6 | M TONER | | | | | | | | | |
| 7 | C TONER | | | | | | | | | |
| 8 | K TONER | | | | | | | 1 | | |
| 9 | STAPLE NEEDLE | | | | | | | | | |

FIG. 15

ADMINISTRATOR TABLE

| ADMINISTRATOR NUMBER j | ADMINISTRATOR ID |
|---|---|
| 1 | ADMINISTRATOR A |
| 2 | ADMINISTRATOR B |
| 3 | ADMINISTRATOR C |

FIG. 16

CONSUMABLES TABLE

| CONSUMABLE ITEM NUMBER i | CONSUMABLE ITEM | REMAINING AMOUNT | CONSUMPTION SPEED |
|---|---|---|---|
| 1 | TRAY A | 90% | ○○ MINUTES/1% |
| 2 | TRAY B | 75% | ○△ MINUTES/1% |
| 3 | TRAY C | 2% | ○× MINUTES/1% |
| 4 | TRAY D | 60% | ×○ MINUTES/1% |
| 5 | Y TONER | 95% | ×△ MINUTES/1% |
| 6 | M TONER | 40% | ×× MINUTES/1% |
| 7 | C TONER | 55% | △△ MINUTES/1% |
| 8 | K TONER | 4% | △× MINUTES/1% |
| 9 | STAPLE NEEDLE | 70% | △○ MINUTES/1% |

FIG. 17

NOTIFICATION START REMAINING AMOUNT TABLE

| CONSUMABLE ITEM TYPE NUMBER k | CONSUMABLE ITEM TYPE | NOTIFICATION START REMAINING AMOUNT | NOTIFIED REMAINING AMOUNT |
|---|---|---|---|
| 1 | PAPER | 5% | 2% |
| 2 | TONER | 3% | |
| 3 | STAPLE NEEDLE | 3% | |

CONSUMABLES MANAGEMENT SYSTEM
AND CONSUMABLES MANAGEMENT
DEVICE

CROSS-REFERENCE TO RELATED
APPLICATIONS

This application is based on and claims priority under 35 USC 119 from Japanese Patent Application No. 2017-057643 filed Mar. 23, 2017.

BACKGROUND (i) Technical Field

The present invention relates to a consumables management system and a consumables management device.

(ii) Related Art

Various types of service providing devices are known in which consumables whose consumption may be recovered by replacement or replenishment are mounted and which provide services accompanying consumption of the consumables. Here, as one of such service providing devices, a multifunction peripheral will be described. The multifunction peripheral described herein is a stationary type device having a function of an electrophotographic type printer. In addition to the function as a printer, the multifunction peripheral has plural complex functions, such as a scanner function and a function as a copy machine. Consumables, such as toner and paper, are mounted in the multifunction peripheral, and print output is performed while consuming the consumables. For this reason, in the multifunction peripheral, in a case where consumables, such as toner and paper, are no longer present, it is not possible to provide a service, such as print output using the consumables. Therefore, the administrator of the multifunction peripheral has to always pay attention so that the consumables are not exhausted from the multifunction peripheral.

In order to assist the administrator's attention, displaying on the display screen of the multifunction peripheral that the remaining amount of each consumable item has been reduced or that this is time to replace or replenish the consumable item is known. In the case of this method, however, the administrator is forced to constantly monitor the display screen of the multifunction peripheral. Accordingly, there is a problem that the burden on the administrator is high.

SUMMARY

According to an aspect of the invention, there is provided a consumables management system including: a service providing device side communication unit that performs communication relevant to consumption information of a consumable item with a mobile device present within a communication area set in advance corresponding to a service providing device in which a consumable item whose consumption is recoverable by replacement or replenishment is mounted and which provides a service accompanying consumption of the consumable item; a mobile device side communication unit that is mounted in the mobile device and that performs communication relevant to the consumption information with the service providing device side communication unit in a case where the mobile device is present within the communication area; and a notification unit that notifies an administrator possessing the mobile device that a remaining amount of the consumable item mounted in the service providing device has been reduced to a predetermined threshold remaining amount or less in a case where it is determined based on the consumption information that the remaining amount of the consumable item mounted in the service providing device has been reduced to the threshold remaining amount or less.

BRIEF DESCRIPTION OF THE DRAWINGS

Exemplary embodiment(s) of the present invention will be described in detail based on the following figures, wherein:

FIG. 2 is a diagram showing an administrator table stored in a multifunction peripheral;

FIG. 3 is a diagram showing a consumables table in which consumables of the multifunction peripheral are recorded;

FIG. 4 is a diagram showing a notification completion table;

FIG. 15 is a diagram showing an administrator table stored in a multifunction peripheral;

FIG. 16 is a diagram showing a consumables table in which consumables of the multifunction peripheral are recorded;

FIG. 17 is a diagram showing a notification start remaining amount table;

DETAILED DESCRIPTION

Hereinafter, exemplary embodiments of the invention will be described.

Figure 1:
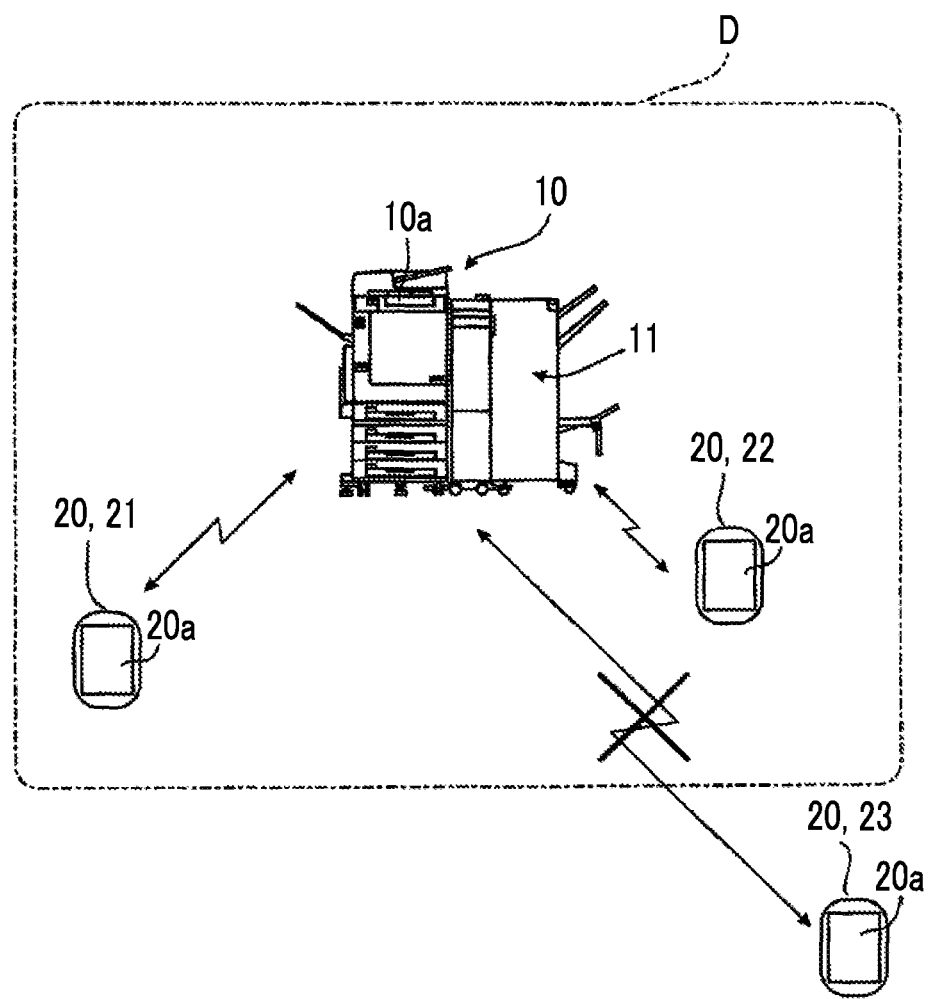
FIG. 1 is a diagram showing one multifunction peripheral and plural mobile devices that form an example of a consumables management system according to an exemplary embodiment of the invention.

FIG. 1 is a diagram showing one multifunction peripheral and plural mobile devices that form an example of a consumables management system according to an exemplary embodiment of the invention.

Each of a multifunction peripheral 10 and a mobile device 20 has a communication function based on Wi-Fi. When moving into a communication area D in which communication may be performed by Wi-Fi installed in the multifunction peripheral 10, each mobile device 20 may communicate with the multifunction peripheral 10 by using the communication function based on the installed Wi-Fi. In the example shown in FIG. 1, since two mobile devices 21 and 22 among the three mobile devices 20 shown herein are located within the communication area D, Wi-Fi communication between each of the mobile devices 21 and 22 and the multifunction peripheral 10 is possible. On the other hand, since one mobile device 23 is located at a position deviating from the communication area D, the mobile device 23 cannot communicate with the multifunction peripheral 10. However, each mobile device 20 is possessed by the administrator and moves, and may communicate with the multifunction peripheral 10 in a case where the mobile device 20 moves into the communication area D, but cannot communicate with the multifunction peripheral 10 in a case where the mobile device 20 deviates from the communication area D.

Each mobile device 20 includes a touch panel type display screen 20a. On the display screen 20a, various kinds of display for the user possessing the mobile device 20 and various kinds of instruction input by the user are performed.

Here, the multifunction peripheral 10 has a function as a printer based on an electrophotographic method, a function as a scanner, and a copy function. A personal computer (not shown; hereinafter, abbreviated as a PC) is connected to the multifunction peripheral 10.

In a case where the multifunction peripheral 10 is used as a printer, the multifunction peripheral 10 receives image data from the PC, and prints out an image based on the received image data on paper according to an instruction of data attached to the image data. Alternatively, image data for print output may be stored in the mobile device 20, and the image data may be transmitted to the multifunction peripheral 10 using Wi-Fi communication.

In a case where the multifunction peripheral 10 is used as a scanner, the multifunction peripheral 10 reads an image on paper, and transmits image data obtained by the reading to the PC or the mobile device 20.

In a case where the multifunction peripheral 10 is used as a copy machine, an image on paper is read by a scanner, and an image based on image data obtained by the reading is printed out on paper.

The multifunction peripheral 10 also includes a touch panel type display screen 10a. On the display screen 10a, various kinds of display for the user of the multifunction peripheral 10 and various kinds of instruction input by the user are performed.

The multifunction peripheral 10 includes a post-processing machine 11. The post-processing machine 11 is a device for punching a hole on paper on which an image is printed or for binding paper with a staple needle as a bundle in response to an instruction. Since the structure or function itself of the multifunction peripheral 10 or the post-processing machine 11 is not the subject of the present exemplary embodiment, further explanation thereof will be omitted.

FIG. 2 is a diagram showing an administrator table stored in the multifunction peripheral.

The administrator registered in the administrator table is in charge of the replacement or replenishment of consumables of the multifunction peripheral 10. General users other than the administrator, who are authorized to use the multifunction peripheral 10, are also registered in the multifunction peripheral 10, and only registered users may use the multifunction peripheral 10. However, how to use the multifunction peripheral 10 by a general user is not the subject herein, and accordingly the explanation herein will be omitted. Since the subject herein is relevant to the replacement or replenishment of consumables of the multifunction peripheral 10, this will be described below.

In the administrator table shown in FIG. 2, three administrators A, B, and C are registered as administrators of the multifunction peripheral 10. Here, the administrators A, B, and C are IDs for identifying mobile devices possessed by the administrators. Administrator numbers j=1, 2, 3 are given to the administrators A, B, and C. Priorities are given in order of the administrator numbers. That is, in a case where the remaining amount of a consumable item is reduced, the multifunction peripheral 10 tries notification in order from the administrator having the highest priority.

FIG. 3 is a diagram showing a consumables table in which consumables of the multifunction peripheral are recorded. The consumables table is also stored in the multifunction peripheral 10 and rewritten as needed.

In the consumables table, nine types of consumables with consumable item numbers of i=1 to 9 are arranged. The multifunction peripheral 10 shown in FIG. 1 includes four paper trays of trays A to D. The trays A to D shown in the consumables table means paper stacked and contained in that paper tray. In the example shown in FIG. 3, the remaining amounts of paper contained in the trays A to D are 90%, 75%, 2%, and 60%, respectively. The remaining amount of paper in the tray C has been reduced to 2%.

In the multifunction peripheral 10, toners of four colors of yellow (Y), magenta (M), cyan (C), and black (K) are used in the case of forming an image on paper. In order to cope with the consumption of these toners, four toner tanks containing toner of each color are mounted in the multifunction peripheral 10. The Y toner to K toner in the consumables table shown in FIG. 3 represents the toner in each toner tank. In the example shown in FIG. 3, the remaining amounts of Y toner to K toner are 95%, 40%, 55%, and 4%, respectively. The remaining amount of K toner has been reduced to 4%.

In the consumables table, a staple needle is registered as a consumable item with the consumable item number i=9. The staple needle is a needle used in the stapling process in the post-processing machine 11. In FIG. 3, the remaining amount is recorded as 70%.

In the consumables table, a field of "consumption speed" is provided. The consumption speed indicates an average speed at which each consumable item is decreasing.

The consumables table has fields of "5% intention" and "3% intention".

In the multifunction peripheral 10, notification to make a request for replacement (replenishment) of consumables is sent to the mobile terminal possessed by the administrator over three times of the timing at which the remaining amount of each consumable item becomes less than 5%, the timing at which the remaining amount of each consumable item becomes less than 3%, and the timing at which the remaining amount of each consumable item becomes less than 1%. In the case of the notification at the timing at which the remaining amount becomes less than 5% and the notification at the timing at which the remaining amount becomes less than 3% among the three notifications, it is not necessary to immediately perform replacement (replenishment) even if the notification is received. Therefore, in such notifications at these timings, a reply as to whether to perform replacement (replenishment) or to postpone is received (refer to FIG. 8), and a flag is set to avoid notifying other administrators in a case where there is a reply to perform replacement (replenishment). However, at the timing at which the remaining amount becomes less than 1%, the multifunction peripheral 10 tries to send notification to all the administrators without hesitating to send notification to plural administrators.

Exemplary contents in the consumables table shown in FIG. 3 will be described.

The current remaining amount of the tray C with the consumable item number i=3 in the consumables table is 2%. Corresponding to the tray C, a flag of "5% intention" is turned on. This means that there is notification prompting the replenishment of paper at the timing at which the remaining amount of paper in the tray C becomes less than 5% and there is a reply indicating that paper is to be replenished from one of the administrators. However, the fact that the current remaining amount is 2% means that no paper replenishment has been performed in practice even though there is a reply indicating that paper is to be replenished at the timing at which the remaining amount of paper becomes less than 5%. Corresponding to the tray C, a flag of "3% intention" is also turned on. Similarly, this means that there is notification prompting the replenishment of paper at the timing at which the remaining amount of paper in the tray C becomes less than 3% and there is a reply indicating that paper is to be replenished from one of the administrators. However, the current remaining amount is 2%, and the replenishment of paper has not been performed at the moment.

The current remaining amount of K toner in the consumables table is 4%. This means that there is a reply indicating that the K toner tank is to be replaced from one of the administrators at the time of notification at the timing at which the remaining amount of K toner becomes less than 5%. However, in the current stage in which the remaining amount becomes 4%, the replacement of the toner tank has not yet been performed. Since the current remaining amount is 4% that is not yet less than 3%, notification at the timing at which the remaining amount is less than 3% has not yet been performed.

FIG. 4 is a diagram showing a notification completion table. The notification completion table is also stored in the multifunction peripheral 10 and rewritten as needed.

The notification completion table is a table indicating which of the three administrators A, B, and C has been notified at each timing at which the remaining amount of each consumable item becomes less than 5%, less than 3%, and less than 1%.

In the example shown in FIG. 4, for example, for the tray C, having sent notification to the administrator A and the administrator B at the timing at which the remaining amount becomes less than 5% and having sent notification to the administrator B at the timing at which the remaining amount becomes less than 3% are recorded. For the K toner, having sent notification to the administrator C at the timing at which the remaining amount becomes less than 5% is recorded.

Here, the notification completion table shown in FIG. 4 means that notification has been sent to the administrator (mobile device of the administrator), but does not mean that there is a reply indicating that replacement (replenishment) is to be performed from the administrator. In addition, the notification completion table shown in FIG. 4 is not for asking whether or not there has been a reply including a reply indicating postponement. Even in a case where the administrator is not aware of the notification, a notification completion flag is set in the notification completion table based on having sent notification to the administrator (mobile device of the administrator).

On the other hand, the flags in the fields of "5% intention" and "3% intention" in the consumables table shown in FIG. 3 means that there has been a reply indicating that replacement (replenishment) is to be performed from one of the administrators (reply from any administrator is okay).

Figure 5:
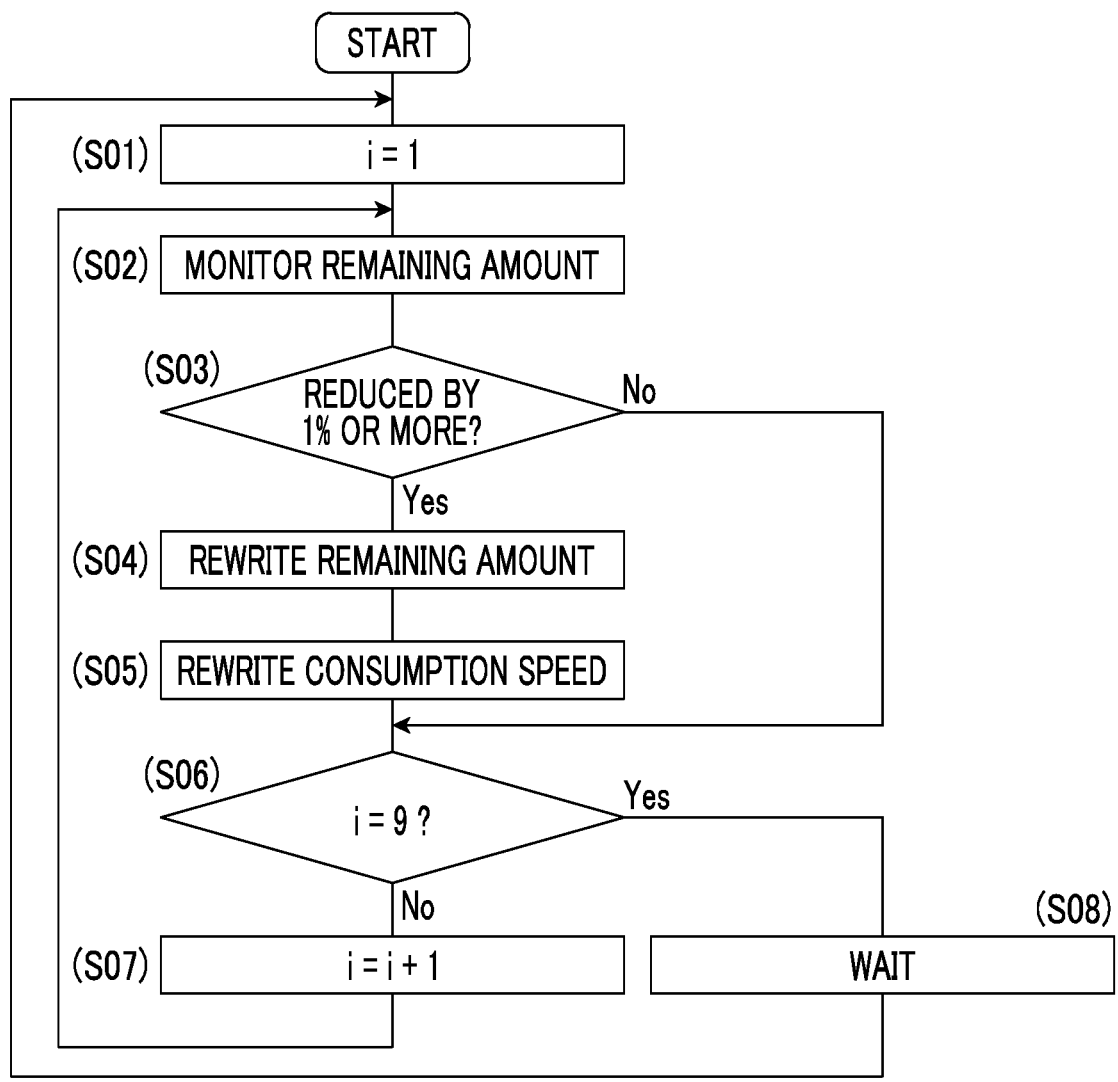
FIG. 5 is a diagram showing a flowchart of a remaining amount and consumption speed update program.

FIG. 5 is a diagram showing a flowchart of a remaining amount and consumption speed update program. The remaining amount and consumption speed update program is a program that is continuously executed in the multifunction peripheral 10 while electric power is supplied to the multifunction peripheral 10.

First, initial setting to the consumable item number i=1 is performed (step S01), and the remaining amount of the consumable item with the consumable item number i is monitored (step S02). Since the multifunction peripheral 10 includes a sensor for detecting the remaining amount of each consumable item or the like, information of the remaining amount is obtained from the sensor or the like in step S02. An explanation regarding the remaining amount detection method will be omitted.

Then, in a case where the obtained remaining amount is reduced by 1% or more from the remaining amount of the consumable item with the same consumable item number i that is recorded in the consumables table shown in FIG. 3 (step S03), the remaining amount in the consumables table is rewritten (step S04). Then, the consumption speed is recalculated and rewritten in consideration of the time reduced to the remaining amount (step S05).

Then, until the consumable item number i reaches i=9 (step S06), the consumable item number i is updated (step S07), and the above-described processing (steps S02 to S05) is repeated for the updated consumable item number i. I=9 corresponds to the fact that nine types of consumables are present in the multifunction peripheral 10 (refer to FIG. 3).

In a case where the consumable item number i reaches i=9 (step S06), the process stands by temporarily (step S08), the consumable item number i is initially set to i=1 again (step S01), and the above processing is repeated.

Figure 6:
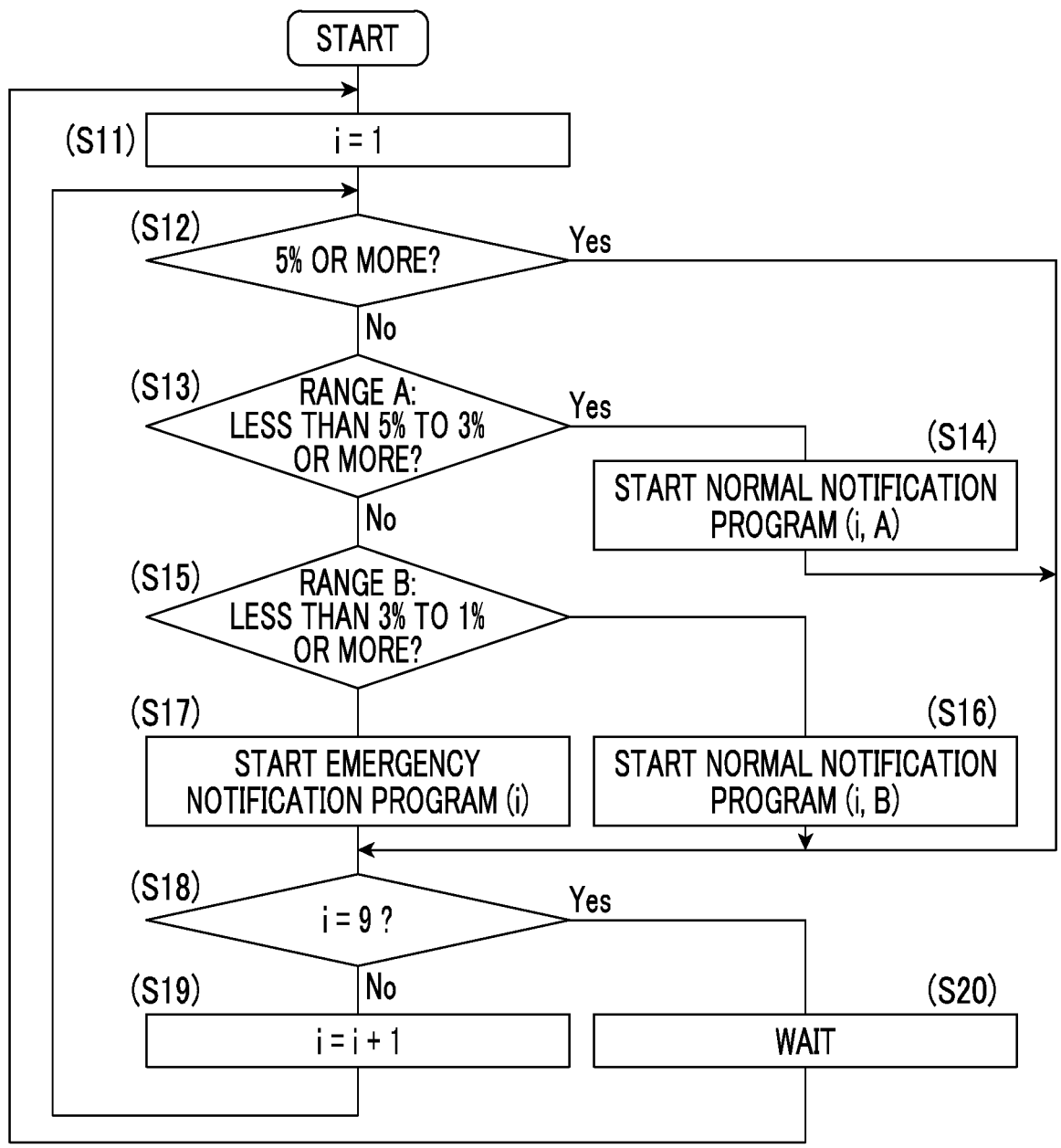
FIG. 6 is a diagram showing a flowchart of a notification timing monitoring program.

FIG. 6 is a diagram showing a flowchart of a notification timing monitoring program. Similarly to the remaining amount and consumption speed update program shown in FIG. 5, the notification timing monitoring program is also a program that is continuously executed in the multifunction peripheral 10 while electric power is supplied to the multifunction peripheral 10. The notification timing monitoring program is a program for monitoring whether or not this is a notification timing with reference to the consumables table shown in FIG. 3.

Here, the consumable item number i is initially set to i=1 (step S11). Then, it is determined whether or not the remaining amount of the consumable item with the consumable item number i is 5% or more (step S12). In a case where the remaining amount of the consumable item with the consumable item number i is 5% or more, the process proceeds to step S18. In a case where i is not 9, the consumable item number i is updated (step S19), and the remaining amount of the consumable item with the updated consumable item number i is checked.

Figure 7:
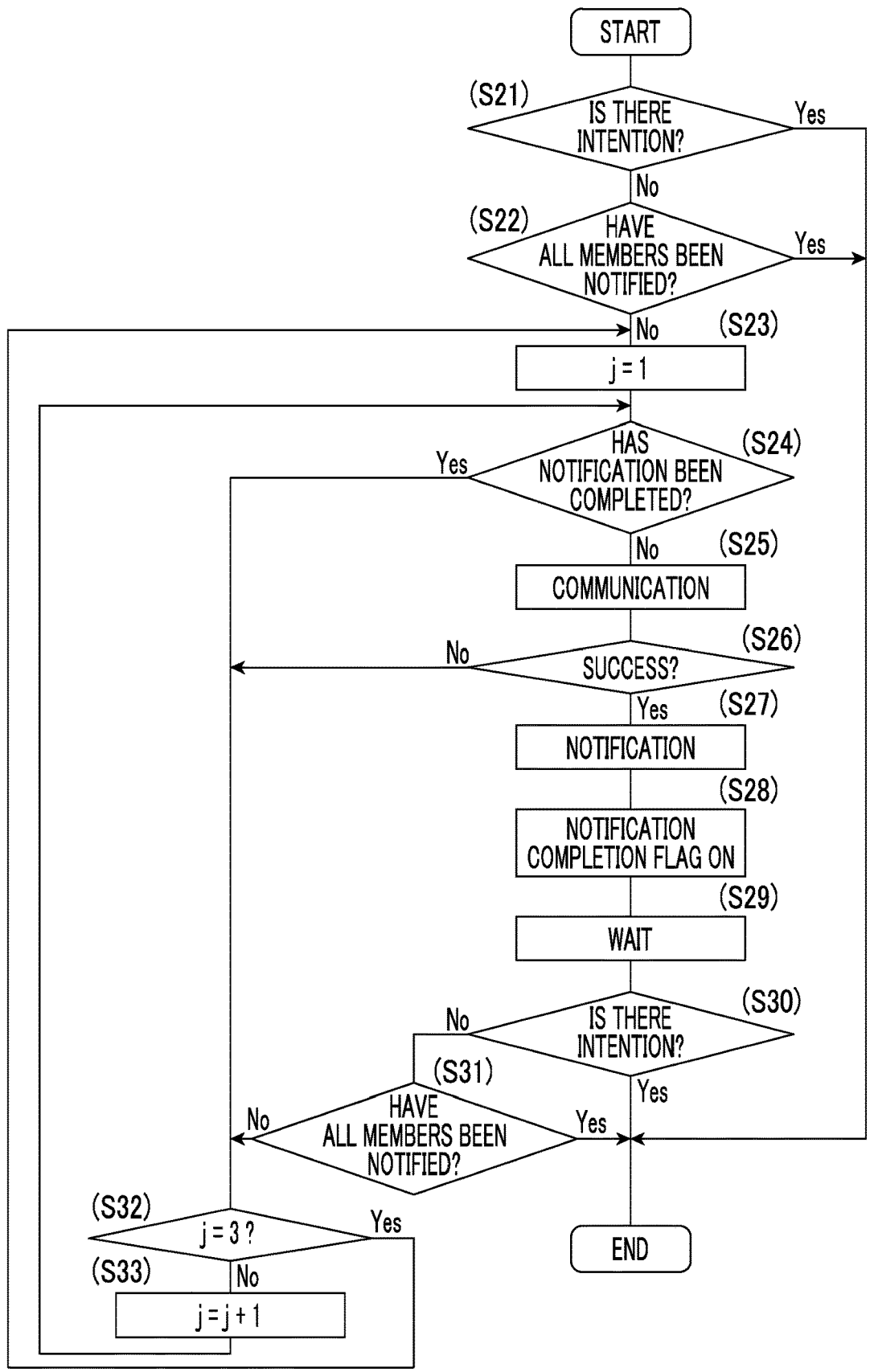
FIG. 7 is a diagram showing a flowchart of a normal notification program.

In a case where it is determined that the remaining amount is not 5% or more in step S12, it is determined whether or not the remaining amount of the consumable item is in a range (this is referred to as "range A") from less than 5% to 3% or more (step S13). In a case where the remaining amount is in the range A, a normal notification program shown in FIG. 7 is started with the consumable item number i and the range A as arguments (step S14). The normal notification program will be described later.

In a case where it is determined that the remaining amount is not in the range A in step S13, it is determined whether or not the remaining amount is in a range (this is referred to as "range B") from less than 3% to 1% or more (step S15). In a case where the remaining amount is in the range B, the normal notification program shown in FIG. 7 is started with the consumable item number i and the range B as arguments (step S16).

Figure 8:
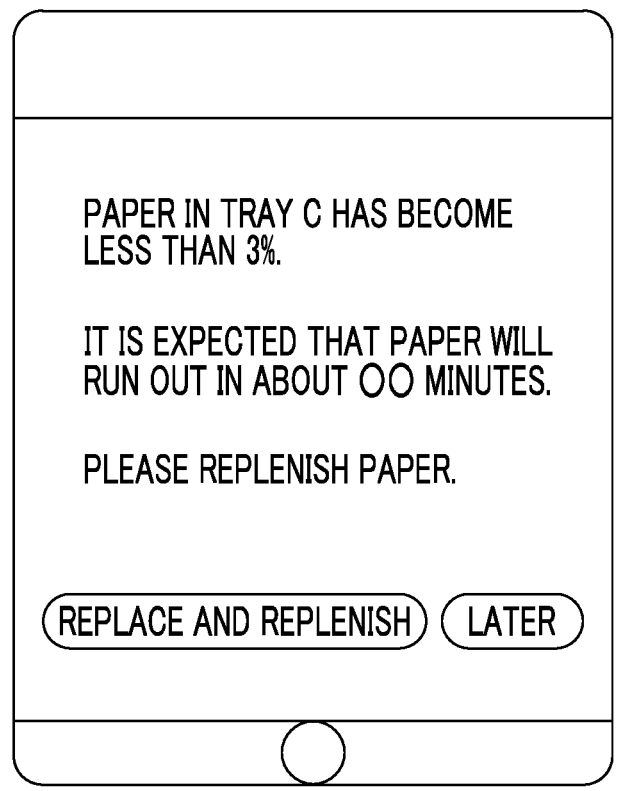
FIG. 8 is a diagram showing an example of the notification in step S27 of FIG. 7.

In a case where it is determined that the remaining amount is not in the range B in step S15, this means that the remaining amount is less than 1%. In this case, an emergency notification program shown in FIG. 8 is started with the consumable item number i as an argument (step S17). The emergency notification program will be described later.

The above processing is repeated until the consumable item number i reaches i=9 (steps S18 and S19). In a case where the consumable item number i reaches i=9 (step S18), the process stands by temporarily (step S20), initial setting to i=1 is performed again (step S11), and the above processing is repeated.

FIG. 7 is a diagram showing a flowchart of the normal notification program.

The normal notification program is a program started with the consumable item number i and the range A or the range B as arguments in step S14 or step S16 of FIG. 6. In the normal notification program, the consumables table shown in FIG. 3 and the notification completion table shown in FIG. 4 are referred to, and the notification completion table is updated as needed.

In a case where the normal notification program shown in FIG. 7 is started, first, the field of "5% intention" (in the case of the range A) or "3% intention" (in the case of the range B), which are determined by the consumable item number i and the range A or B indicated by the arguments, in the consumables table shown in FIG. 3, are referred to. In a case where a flag indicating the intention of replacement (replenishment) is set (step S21), the process ends as it is. That is, in a case where a reply indicating the intention of replacement (replenishment) has been received from one of the administrators, other administrators are not notified.

In a case where a flag indicating the intention of replacement (replenishment) is not set, it is determined whether or not a notification completion flag is set in the field of 5% or 3% determined by the consumable item number i and the range A or B indicated by the arguments, for all the administrators A to C indicated by the administrator number j=1 to 3, with reference to the notification completion table shown in FIG. 4 (step S22). Then, in a case where all the three administrators have been notified, the process ends as it is even if the flag indicating the intention of replacement (replenishment) is not set.

In a case where none of the three administrators with the administrator number i=1 to 3 have been notified, the administrator number j is initially set to j=1 first (step S23). Then, it is determined whether or not the administrator with the administrator number j has been notified (step S24). In a case where the administrator with the administrator number j has been notified, the process proceeds to step S32. In a case where the administrator with the administrator number j has not been notified, Wi-Fi communication with the mobile device possessed by the administrator with the administrator number j is tried (step S25). In a case where the communication fails (step S26), typically, in a case where the administrator is not within the communication area D shown in FIG. 1, the process proceeds to step S32 in the same manner as in the case of notification completion. On the other hand, in a case where the communication succeeds (step S26), the notification is sent to the mobile device of the administrator (step S27).

FIG. 8 is a diagram showing an example of the notification in step S27 of FIG. 7.

For example, a screen shown in FIG. 8 is displayed on the display screen of the mobile device of the administrator. "The remaining amount of paper in the tray C is less than 3%" in this display corresponds to an argument (i=3, range B). "There is a possibility that paper will run out in about OO minutes" in this display is displayed for a short time with reference to the field of consumption speed with the consumable item number i=3 (tray C).

On the screen, a "replace and replenish" button and a "later" button are shown. In a case where any one of the two buttons is pressed, the screen display disappears. In a case where the "replace and replenish" button is pressed, a flag of the field of the corresponding "intention" in the consumables table shown in FIG. 3 is set. In the case of the display shown in FIG. 8, the flag of the field of "3% intention" for the tray C with the consumable item number i=3 is set. Details of this point will be described later, and the explanation will be continued referring back to FIG. 7 herein.

In a case where notification is sent in step S27, a corresponding notification completion flag in the notification completion table shown in FIG. 4 is turned on (step S28). Then, the process stands by for a short time expecting the "replace and replenish" button or the "later" button on the screen shown in FIG. 8 to be pressed (step S29). Then, in a case where the "replace and replenish" button is pressed, a corresponding "intention" flag is set (refer to step S62 in FIG. 12). In step S30, it is checked whether or not a flag of the field of the corresponding "intention" is set. In the case of "intention", the execution of the normal notification program shown in FIG. 7 for the arguments (i and A or B) ends.

In a case where it is not possible to check the intention of replacement (replenishment) in step S30, in a case where notification has been sent to all the three administrators with the administrator number j=1 to 3 (step S31), the process ends as it is. In a case where all the administrators have not yet been notified, in a case where the administrator number j is not j=3 (step S32), the administrator number j is updated (step S33). In a case where the administrator number j is j=3, the process returns to step S23 in which the administrator number j is returned to the initial value j=1, and this notification processing is repeated again.

Figure 9:
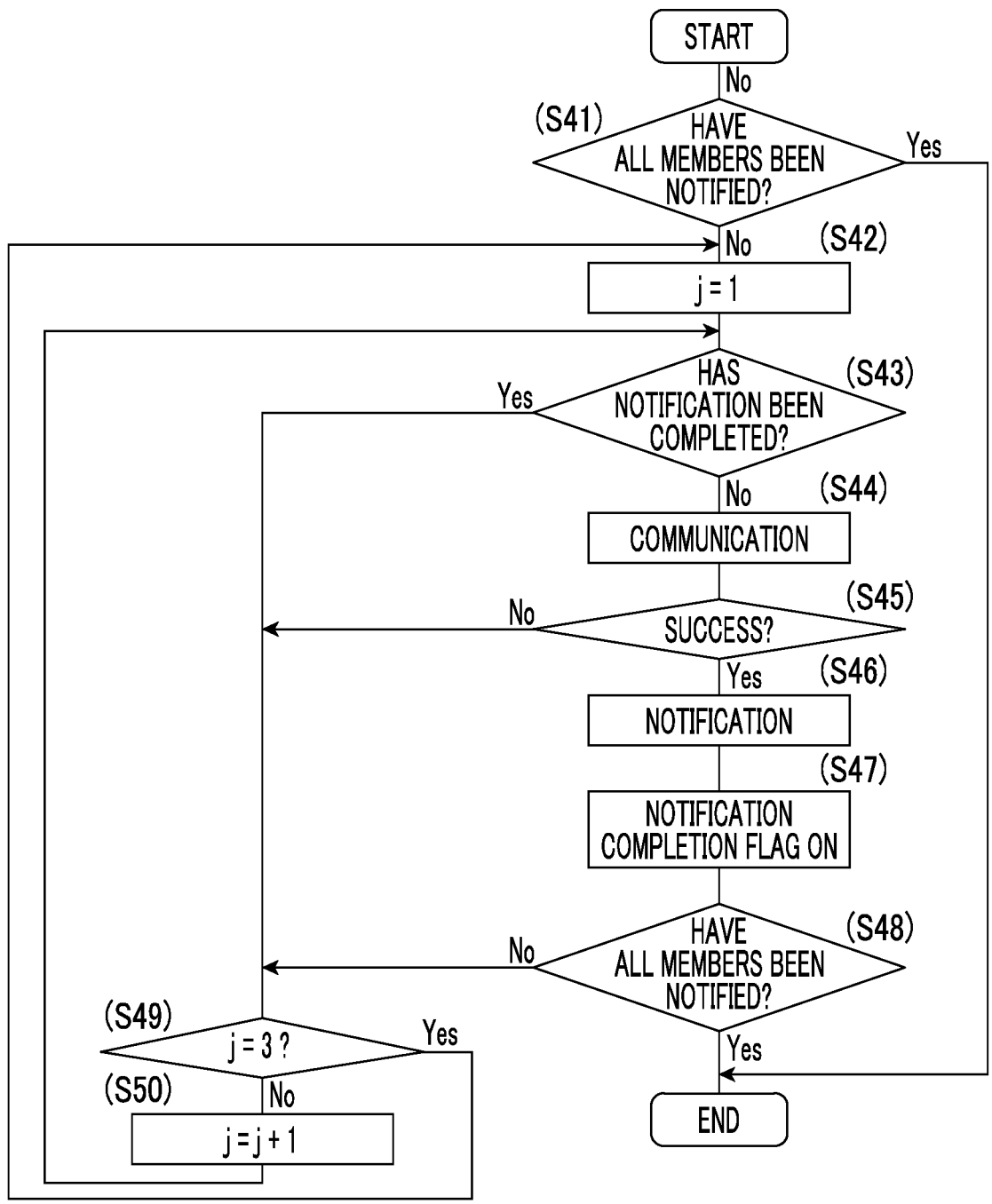
FIG. 9 is a diagram showing a flowchart of an emergency notification program.

FIG. 9 is a diagram showing a flowchart of the emergency notification program.

The emergency notification program is a program started with the consumable item number i as an argument in step S17 of FIG. 6. In the emergency notification program, the notification completion table shown in FIG. 4 is referred to, and the notification completion table is updated as needed.

In a case where the emergency notification program shown in FIG. 9 is started, it is determined whether or not a notification completion flag is set in the field of 1% of the consumable item number i indicated by the argument, for all the administrators A to C indicated by the administrator number j=1 to 3, with reference to the notification completion table shown in FIG. 4 (step S41). In a case where all the three administrators have been notified, the process ends as it is.

In a case where none of the three administrators with the administrator number i=1 to 3 have been notified, the administrator number j is initially set to j=1 first (step S42). Then, it is determined whether or not the administrator with the administrator number j has been notified (step S43). In a case where the administrator with the administrator number j has been notified, the process proceeds to step S49. In a case where the administrator with the administrator number j has not been notified, Wi-Fi communication with the mobile device possessed by the administrator with the administrator number j is tried (step S44). In a case where the communication fails (step S45), typically, in a case where the administrator is not within the communication area D shown in FIG. 1, the process proceeds to step S49. On the other hand, in a case where the communication succeeds (step S45), the notification is sent to the mobile device of the administrator (step S46).

Figure 10:
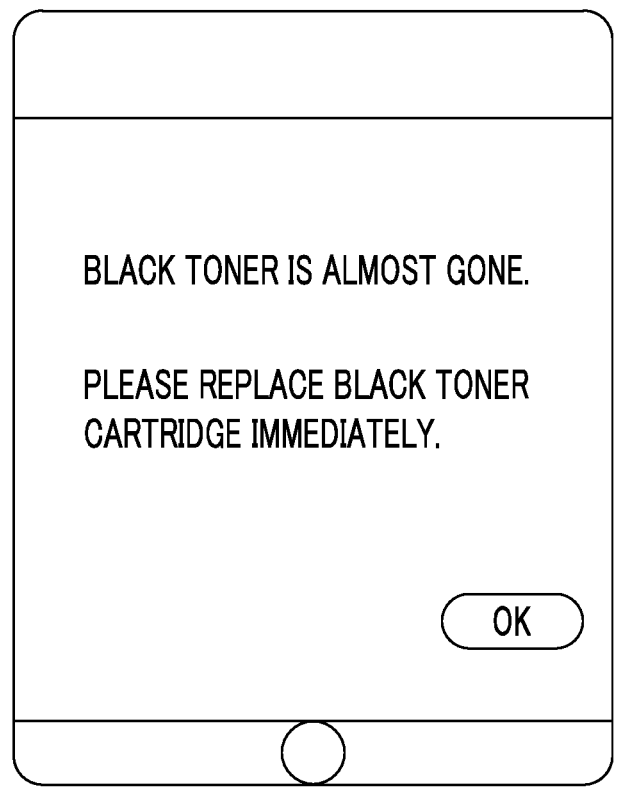
FIG. 10 is a diagram showing an example of the notification in step S46 of FIG. 9.

FIG. 10 is a diagram showing an example of the notification in step S46 of FIG. 9.

For example, a screen shown in FIG. 10 is displayed on the display screen of the mobile device of the administrator. This display is a display in a case where the remaining amount of K toner of the argument (consumable item number) i=8 becomes less than 1%. On the screen, an "OK" button is shown. There are no options other than the "OK" button. In a case where the "OK" button is pressed, the display on the screen just disappears, and the multifunction peripheral 10 does not know it.

Referring back to FIG. 9, the explanation will be continued.

In a case where notification is sent in step S46, a corresponding notification completion flag in the notification completion table shown in FIG. 4 is turned on (step S47). In a case where notification has been sent to all the three administrators with the administrator number j=1 to 3 (step S48), the process ends as it is. In a case where all the administrators have not yet been notified, in a case where the administrator number j is not j=3 (step S49), the administrator number j is updated (step S50). In a case where the administrator number j is j=3, the process returns to step S42 in which the administrator number j is returned to the initial value j=1, and this notification processing is repeated again.

Thus, in the case of the emergency notification program, notification to all the administrators is tried without checking the intention of replacement and replenishment.

Figure 11:
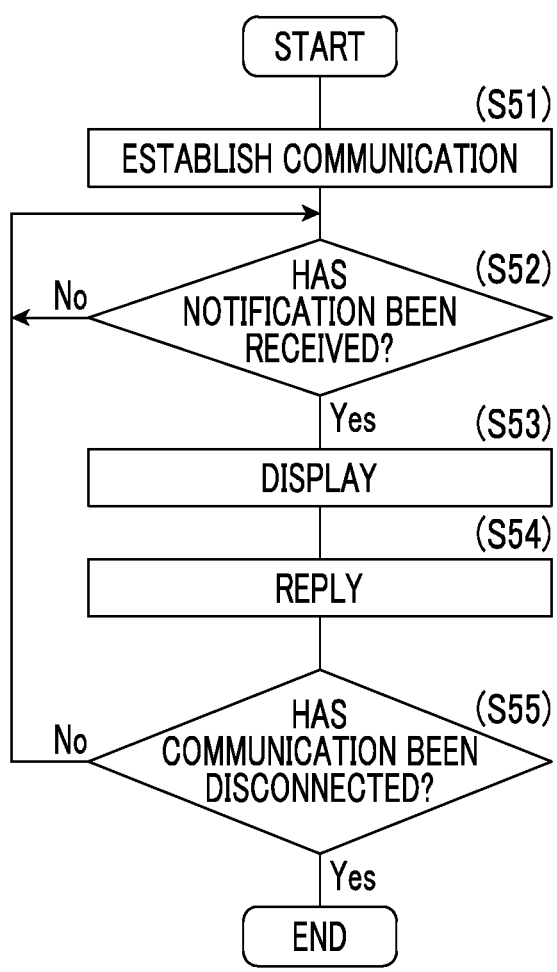
FIG. 11 is a diagram showing a flowchart of a communication program executed in a mobile device.

FIG. 11 is a diagram showing a flowchart of a communication program executed in a mobile device.

In a case where a mobile device is located within the communication area D shown in FIG. 1, communication with a multifunction peripheral is established in response to a call for communication from the multifunction peripheral (step S51). In a case where a notification from the multifunction peripheral is received (step S52), display corresponding to the received notification is performed on the display screen of the mobile device (step S53). Then, in a case where the "replace and replenish" button or the "later" button is pressed on the screen exemplified in FIG. 8, a reply corresponding to the pressed button is transmitted to the multifunction peripheral (step S54). However, in the case of the "OK" button exemplified in FIG. 10, even if the button is pressed, no reply is sent to the multifunction peripheral. Thereafter, a wait for reception of new notification occurs (step S52). In a case where the communication is disconnected after leaving the communication area D (step S55), the execution of the communication program ends.

Figure 12:
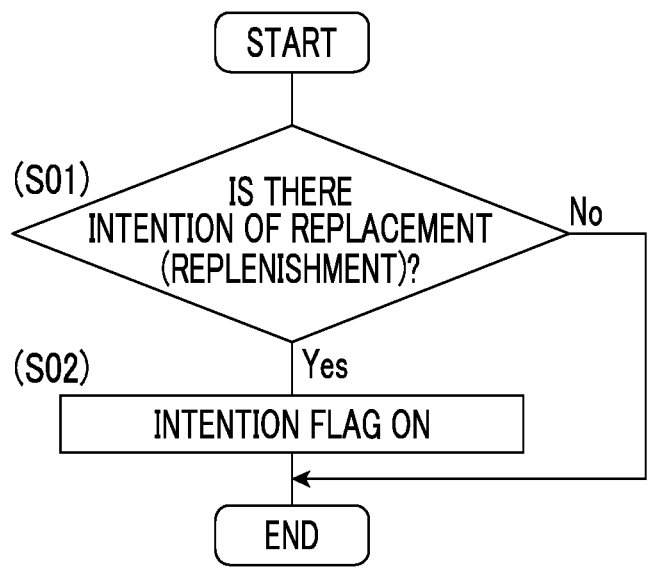
FIG. 12 is a diagram showing a flowchart of a replacement and replenishment intention determination program.

FIG. 12 is a diagram showing a flowchart of a replacement and replenishment intention determination program. The replacement and replenishment intention determination program is executed in the multifunction peripheral in a case where the multifunction peripheral receives a reply in step S54 of FIG. 11.

Here, it is determined whether the reply from the mobile device is "replace and replenish" or "later" (step S61). Then, in a case where the reply is "replace and replenish", a corresponding "intention" flag in the consumables table shown in FIG. 3 is turned on (step S62).

Figure 13:
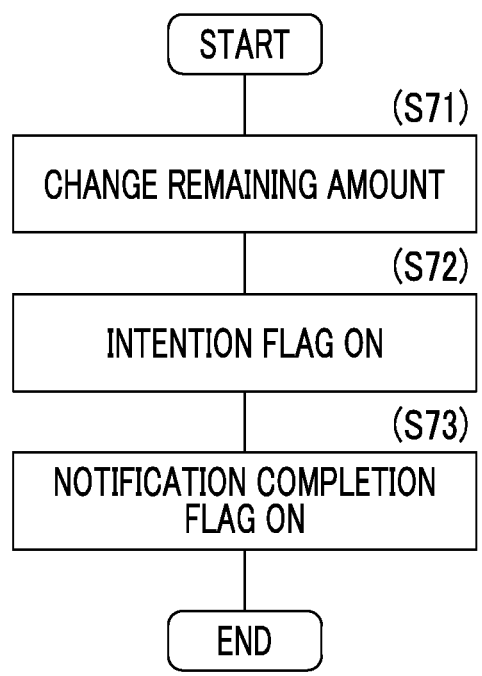
FIG. 13 is a diagram showing a flowchart of an initialization program executed in a multifunction peripheral in response to the replacement or replenishment of consumables.

FIG. 13 is a diagram showing a flowchart of an initialization program executed in a multifunction peripheral in response to the replacement or replenishment of consumables.

Here, the remaining amount of the replaced or replenished consumable item in the consumables table shown in FIG. 3 is changed to the remaining amount after the replacement or replenishment (step S71), and all "intention" flags corresponding to the consumable item are turned off (step S72). Then, all the notification completion flags, which are relevant to the consumable item replaced or replenished this time, in the notification completion table shown in FIG. 4 are turned off (step S73).

Here, it is assumed that the administrator responds uniformly regardless of the type of consumables. However, administrators may be classified according to the type of consumables, for example, in a case where consumables requiring proficiency in replacement and consumables requiring no special skills in replacement are present.

In addition, a case where the multifunction peripheral itself manages the remaining amount of each consumable item and the multifunction peripheral itself has a function of performing communication with the mobile device has been described herein. However, a consumables management device for managing the remaining amount of each consumable item in the multifunction peripheral and performing communication with the mobile device may be provided separately from the multifunction peripheral, and the processing on the multifunction peripheral side described so far may be delegated not to the multifunction peripheral itself but to the consumables management device.

In addition, although the administrator is notified of the fact that the remaining amount of the consumable item is small using the mobile device herein, display on the display screen of the multifunction peripheral may be used in addition to sending notification to the administrator using the mobile device. In this case, instead of simply using these together, display on the display screen of the multifunction peripheral and notification to the administrator using the mobile device may be made to cooperate with each other as follows.

The fact that the remaining amount of the consumable item is small is displayed first on the display screen of the multifunction peripheral, and the administrator is notified of the fact using the mobile device in a case where the consumable item is not replaced or replenished even after waiting for a predetermined time. In this manner, in a case where replacement or the like is performed by recognizing the display on the display screen of the multifunction peripheral, it is not necessary to send an unnecessary notification to the administrator possessing the mobile device.

After the remaining amount of the consumable item decreases below the threshold remaining amount, the situation is not immediately displayed on the display screen of the multifunction peripheral and but displayed on the display screen of the multifunction peripheral in a case where the mobile device of the administrator is present within the communication area D. In a case where there is no administrator within the communication area D, that is, in the vicinity of the multifunction peripheral, even if the situation is displayed on the display screen of the multifunction peripheral, the administrator does not recognize the situation. Therefore, it is possible to prevent providing unnecessary information to general users other than the administrator due to displaying on the display screen of the multifunction peripheral.

In order to make it easier for the administrator to recognize the display on the display screen of the multifunction peripheral, the display is made more noticeable as the remaining amount of the consumable item becomes smaller or as the passage of time after the start of display becomes longer. As a noticeable display, it is conceivable, for example, to change the color of the background, to increase the sizes of displayed characters, figures, buttons, and the like, and to change the layout of the display.

Display contents between the mobile device and the multifunction peripheral may be made to cooperate with each other. For example, a fact that information regarding the replacement or replenishment of the consumable item is displayed on the display screen of the multifunction peripheral may be displayed on the display screen of the mobile device of the administrator, and the detailed contents may be displayed on the display screen of the multifunction peripheral.

In the explanation herein, it is assumed that Wi-Fi communication is performed between the multifunction peripheral and the mobile device. However, communication may also be performed using other communication methods capable of setting a communication area having an appropriate width around the multifunction peripheral, such as Bluetooth (registered trademark).

In addition, although the consumables of the multifunction peripheral are taken as examples herein, the present invention is not limited to the multifunction peripheral, and may be applied to various types of service providing devices in which consumables whose consumption may be recovered by replacement or replenishment are mounted and which provide services accompanying consumption of the consumables.

This is the explanation of the first example, and a second example will be described next. The first example described so far is an example in which whether or not the remaining amount of the consumable item is at the timing of notification is determined on the mobile device side. However, in the second example described below, whether or not the remaining amount of the consumable item is at the timing of notification is determined on the multifunction peripheral side.

In the following explanation of the second example, for the sake of clarity, a set of diagrams forming the second example including the same diagrams as those used in the explanation of the first example are listed.

Figure 14:
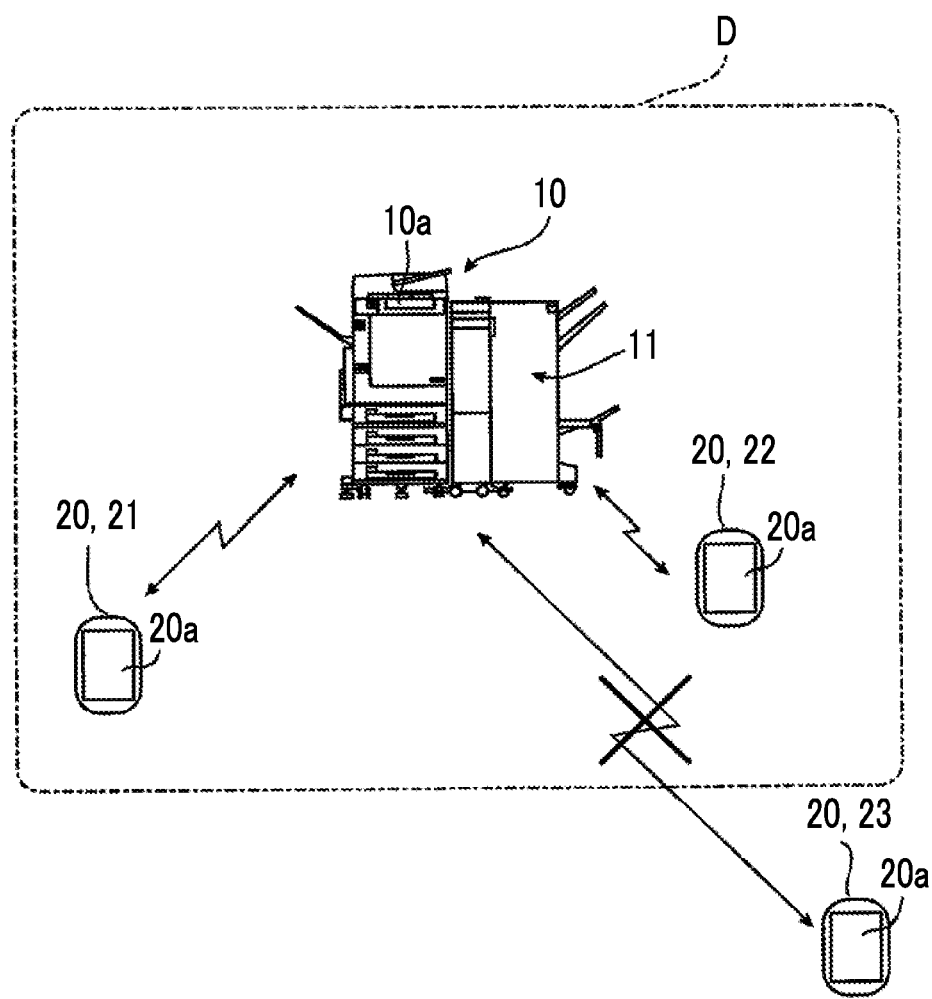
FIG. 14 is a diagram showing one multifunction peripheral and plural mobile devices that form another example of the consumables management system according to an exemplary embodiment of the invention.

FIG. 14 is a diagram showing one multifunction peripheral and plural mobile devices that form another example of the consumables management system according to an exemplary embodiment of the invention.

FIG. 14 is the same diagram as FIG. 1 in the first example, and the repeated explanation thereof will be omitted.

FIG. 15 is a diagram showing an administrator table stored in the multifunction peripheral.

FIG. 15 is the same as the administrator table shown in FIG. 2 in the first example, and the repeated explanation thereof will be omitted.

FIG. 16 is a diagram showing a consumables table in which consumables of the multifunction peripheral are recorded. The consumables table corresponds to the consumables table of the first example shown in FIG. 3 in the first example. The consumables table shown in FIG. 16 is also stored in the multifunction peripheral 10 and rewritten as needed similarly to the consumables table of the first example shown in FIG. 3.

In the consumables table shown in FIG. 16, there are no fields of "5% intention" and "3% intention" in the consumables table shown in FIG. 3. Since each field of the consumables table shown in FIG. 16 other than the fields of "5% intention" and "3% intention" has already been described in the explanation of FIG. 3, the repeated explanation thereof will be omitted herein.

FIG. 17 is a diagram showing a notification start remaining amount table. The notification start remaining amount table is stored in a mobile device possessed by each administrator.

In the notification start remaining amount table, fields of "consumable item type", "notification start remaining amount", and "notified remaining amount" are provided corresponding to a "consumable item type number k".

The "consumable item type number k" is a number given to each type of consumable item. The consumable item type number k=1 corresponds to consumable item type=paper, the consumable item type number k=2 corresponds to consumable item type=toner, and the consumable item type number k=3 corresponds to the consumable item type=staple needle.

The notification start remaining amount indicates the maximum remaining amount at which notification to the administrator is started. In the notification start remaining amount table shown in FIG. 17, it is written that notification is started in a case where the remaining amount becomes less than 5% for "paper" with the consumable item type number k=1, notification is started in a case where the remaining amount becomes less than 3% for "toner" with the consumable item type number k=2, and notification is started in a case where the remaining amount becomes less than 3% similarly to the toner for "staple needle" with the consumable item type number k=3.

The numerical value of the remaining amount written in the field of "notification start remaining amount" differs depending on each mobile device. For example, assuming that the administrator A is usually in charge of the replacement (replenishment) of consumables and the administrators B and C are in charge of the replacement (replenishment) of consumables in a case where the administrator A is absent or the like, a large numerical value is written in the field of "notification start remaining amount" of the notification start remaining amount table stored in the mobile device possessed by the administrator A, and a small numerical value is written in the field of "notification start remaining amount" of the notification start remaining amount table stored in the mobile devices possessed by the administrators B and C. In this manner, a chance that the administrator A will be notified is increased, and the administrators B and C are not notified until the remaining amount of the consumable item reaches, for example, the limit.

In the field of "notified remaining amount" of the notification start table shown in FIG. 17, the remaining amount at the time of last notification is written. In the second example, notification starts after the remaining amount of the consumable item becomes less than the notification start remaining amount. However, even if the remaining amount of the consumable item becomes less than the notification start remaining amount, no notification is sent in a case where the administrator (mobile device) is not located within the communication area D. A notification is sent at a point in time at which the administrator (mobile device) enters the communication area D after the remaining amount of the consumable item becomes less than the notification start remaining amount. In the second example, a notification is sent again in a case where the remaining amount is reduced by 1% or more from the last notification. Therefore, it is assumed that the field of "notified remaining amount" is provided in the notification start table so that the remaining amount at the time of last notification is written.

Figure 18:
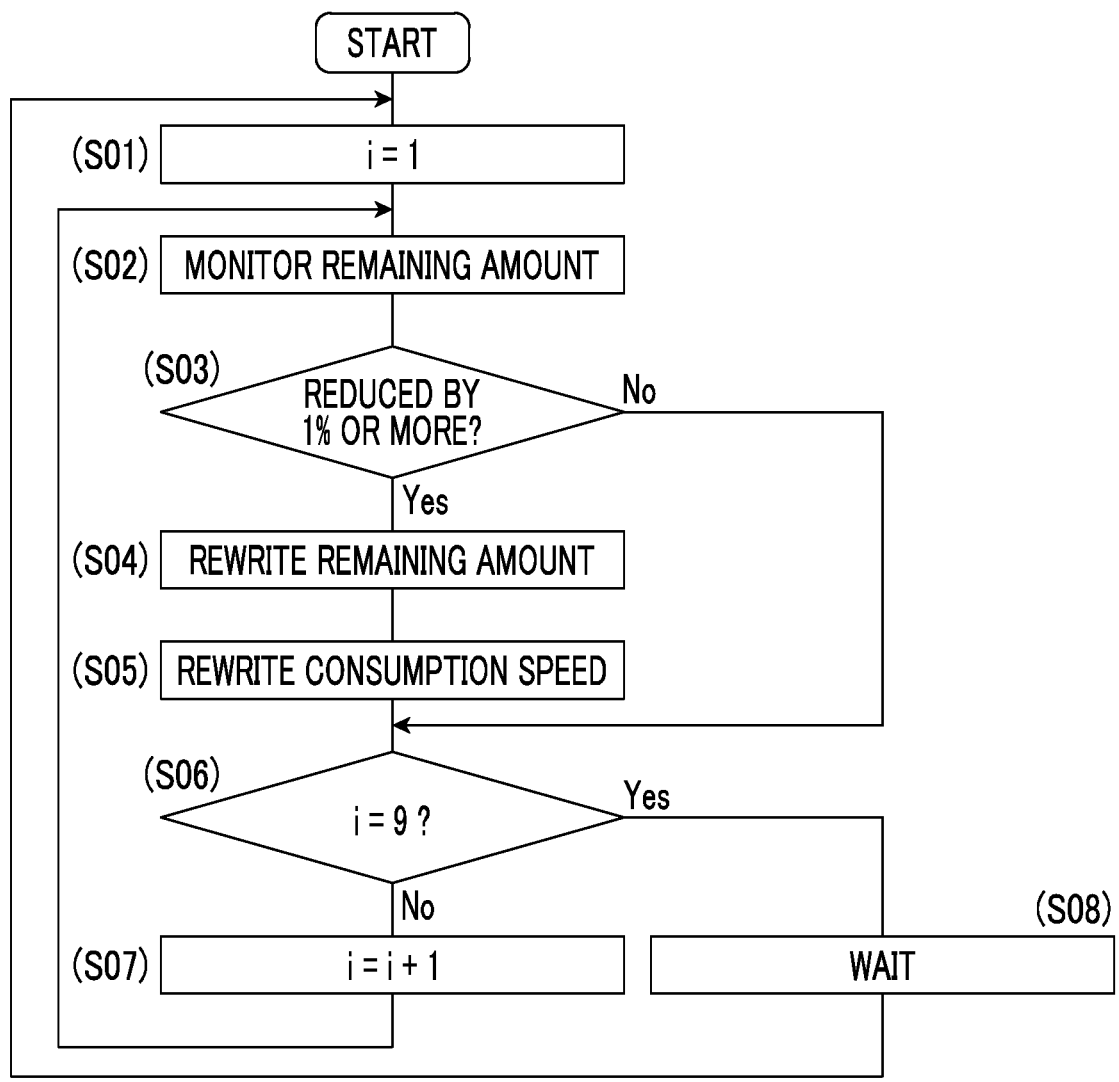
FIG. 18 is a diagram showing a flowchart of a remaining amount and consumption speed update program.

FIG. 18 is a diagram showing a flowchart of a remaining amount and consumption speed update program.

The remaining amount and consumption speed update program shown in FIG. 18 is a program executed in the multifunction peripheral. Since the remaining amount and consumption speed update program is the same as the remaining amount and consumption speed update program shown in FIG. 5 in the first example, the repeated explanation thereof will be omitted.

Figure 19:
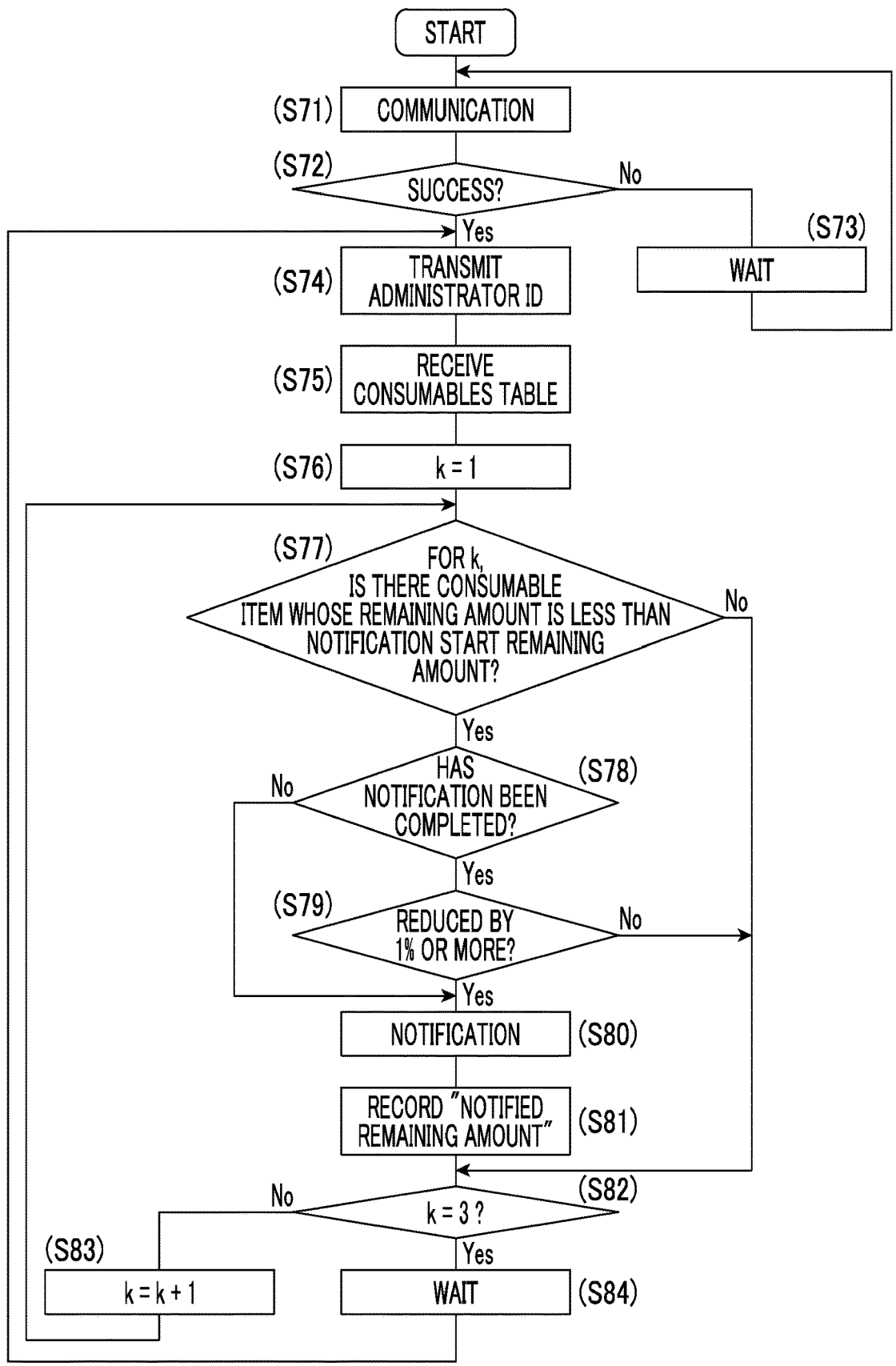
FIG. 19 is a diagram showing a flowchart of a consumables remaining amount notification program.

FIG. 19 is a diagram showing a flowchart of a consumables remaining amount notification program.

First, communication with a multifunction peripheral is repeatedly tried (steps S71 to S73). That is, communication with the multifunction peripheral is tried (step S71). In a case where the communication with the multifunction peripheral is not successful (step S72), communication with the multifunction peripheral is tried again (step S71) after waiting for a predetermined time (step S73).

In a case where the administrator possessing the mobile device enters the communication area D and the mobile device successfully communicates with the multifunction peripheral (step S72), the administrator ID is transmitted to the multifunction peripheral (step S74). This is to check whether or not the administrator is an authorized administrator registered in the multifunction peripheral.

Here, the explanation of the consumables remaining amount notification program shown in FIG. 19 is temporarily stopped, and the processing on the multifunction peripheral side will be described.

Figure 20:
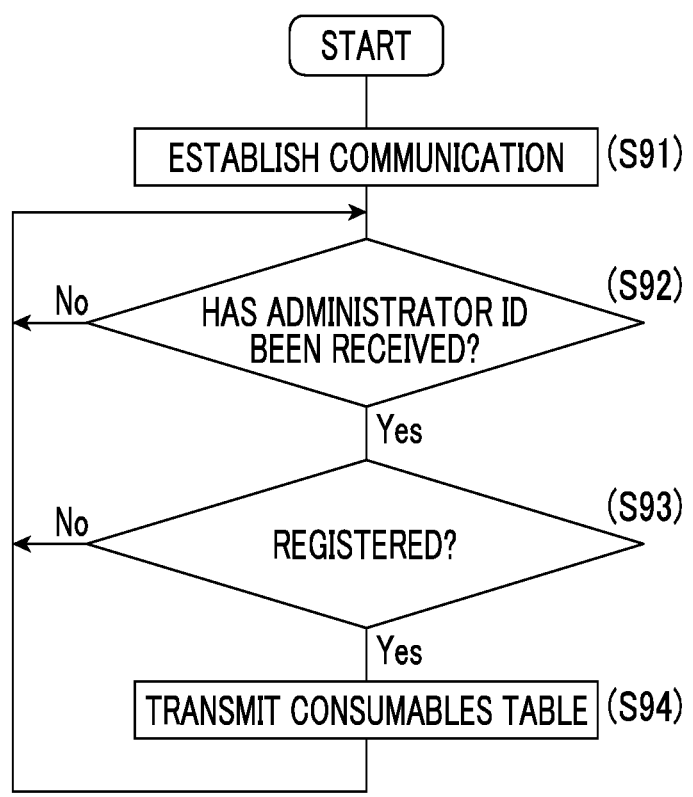
FIG. 20 is a diagram showing a flowchart of a communication program executed in a multifunction peripheral.

FIG. 20 is a diagram showing a flowchart of a communication program executed in a multifunction peripheral.

Here, in response to a call for communication from the mobile device (step S71 in FIG. 19), communication is established (step S91), and the administrator ID is received from the mobile device (step S92). Then, it is determined whether or not the received administrator ID matches one of the administrators registered in the administrator table shown in FIG. 14 (step S93). In a case where the same administrator ID as the administrator ID received from the mobile device is registered in the administrator table, the consumables table shown in FIG. 16 is transmitted to the mobile device from which the administrator ID has been transmitted (step S94), and the process returns to the administrator ID reception wait (step S92).

The explanation of the consumables remaining amount notification program shown in FIG. 19 will be continued.

After transmitting the administrator ID to the multifunction peripheral, the consumables table transmitted from the multifunction peripheral is received (step S75).

Then, the consumable item type number k (refer to FIG. 17) is initially set to k=1 (step S76), and it is determined for the consumable item type number k whether or not there is a consumable item whose remaining amount is less than the notification start remaining amount with reference to the notification start remaining amount table shown in FIG. 17 (step S77). For example, the consumable item type "paper" of the consumable item type number k=1 corresponds to "tray A" to "tray D" in the consumables table shown in FIG. 16. That is, in the case of the consumable item type number k=1, it is checked whether or not there is a tray whose remaining amount of paper is less than 5% that is the notification start remaining amount in step S77. In the example shown in FIG. 16, since the current remaining amount of the tray C is 2%, there is a tray whose remaining amount of paper is less than 5% that is the notification start remaining amount. The consumable item type "toner" of the consumable item type number k=2 corresponds to "Y toner" to "K toner" in the consumables table shown in FIG. 16. That is, in the case of the consumable item type number k=2, it is checked whether or not there is a toner cartridge whose remaining amount of toner is less than 3% that is the notification start remaining amount in step S77. In the example shown in FIG. 16, there is no toner cartridge whose remaining amount of toner is less than 3% that is the notification start remaining amount among "Y toner" to "K toner" at the present moment. This also applies to the case of the staple needle of consumable item type number k=3.

In a case where it is determined that there is no consumable item whose remaining amount is less than the notification start remaining amount for the consumable item type number k in step S77, the process proceeds to step S82. In step S82, in a case where k=3 is not satisfied, k is updated (step S83), and the process returns to step S77 again. In step S77, for the new consumable item type number k, it is checked whether or not there is a consumable item whose remaining amount is less than the notification start remaining amount.

In a case where it is determined that there is a consumable item whose remaining amount is less than the notification start remaining amount for the consumable item type number k in step S77, it is determined whether or not notification has already been sent for the consumable item type number k with reference to the field of "notified remaining amount" of the consumable item type number k (step S78). Then, in a case where notification has already been sent, it is determined whether or not the remaining amount has been reduced by 1% or more from the notified remaining amount recorded in the field of "notified remaining amount" (step S79). In a case where it is determined that notification has already been sent in step S78 or in a case where it is determined that the remaining amount has been reduced by 1% or more from the remaining amount recorded in the field of "notified remaining amount" in step S79, notification to the administrator is performed by display on the display screen (of the mobile device) (step S80).

Figure 21:
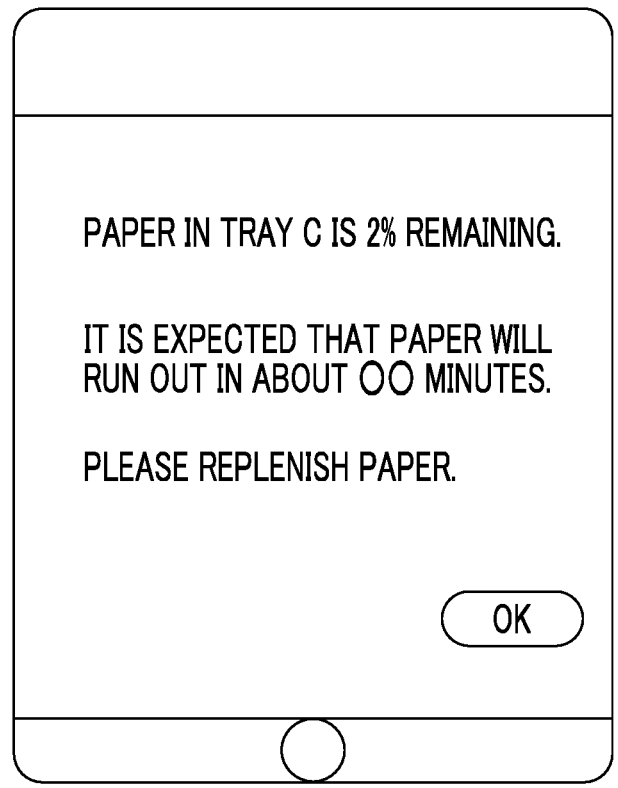
FIG. 21 is a diagram showing an example of the notification screen displayed in step S80 of FIG. 19.

FIG. 21 is a diagram showing an example of the notification screen displayed in step S80 of FIG. 19.

Here, a sentence "Paper in the tray C is 2% remaining. It is expected that paper will run out in about OO minutes. Please replenish the paper" and an "OK" button are displayed. The "OK" button is a button for eliminating the display screen.

Returning again to FIG. 19, the explanation will be continued.

After performing notification as shown in FIG. 20 in step S80, the current remaining amount is recorded in the field of "notified remaining amount" of the current consumable item type number k in the notification start remaining amount table (refer to FIG. 17) (step S81).

Then, in a case where k=3 is not satisfied (step S82), the consumable item type number k is updated (step S83), and it is checked whether or not there is a consumable item whose remaining amount is less than the notification start remaining amount for the new consumable item type number k (step S77). On the other hand, in a case where k=3 is satisfied (step S82), a wait occurs until a timing at which the remaining amount may be further reduced by about 1% (step S84). Then, the administrator ID is transmitted again to the multifunction peripheral (step S74), the consumables table is received (step S75), and the above-described processing is repeated. In a case where the mobile device moves away from the communication area D, the communication between the mobile device and the multifunction peripheral is terminated.

Figure 22:
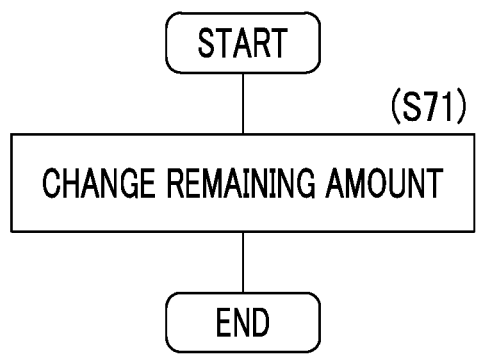
FIG. 22 is a diagram showing a flowchart of an initialization program executed in a multifunction peripheral in response to the replacement or replenishment of consumables.

FIG. 22 is a diagram showing a flowchart of an initialization program executed in a multifunction peripheral in response to the replacement or replenishment of consumables.

Here, the remaining amount of the replaced or replenished consumable item in the consumables table shown in FIG. 16 is changed to the remaining amount after the replacement or replenishment (step S71).

This is the explanation of the second example.

Also in the second example, similarly to the first example described above, administrators may be classified according to consumables, and a consumables management device may be provided separately from the multifunction peripheral.

Also in the second example, similarly to the first example described above, the display on the display screen of the mobile device and the display on the display screen of the multifunction peripheral may be used in combination or in cooperation with each other.

Also in the second example, communication methods other than the Wi-Fi communication may be adopted.

In a service providing device other than the multifunction peripheral, as in the second example, whether or not the remaining amount has been reduced to the notification remaining amount may be determined on the mobile device side.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A consumables management system, comprising:
   a service providing device comprising a processor, wherein the processor of the service providing device is configured to perform communication relevant to consumption information of a consumable item with a mobile device present within a communication area set in advance corresponding to the service providing device in which a consumable item whose consumption is recoverable by replacement or replenishment is mounted and which provides a service accompanying consumption of the consumable item;
   a mobile device configured to perform communication relevant to the consumption information with the service providing device in a case where the mobile device is present within the communication area; and
   a notification processor configured to notify an administrator possessing the mobile device in a sequence listed in an administrator list starting from an administrator having highest priority that an non-zero remaining amount of the consumable item mounted in the service providing device has been reduced to a predetermined threshold remaining amount or less in a case where it is determined based on the consumption information that the non-zero remaining amount of the consumable item mounted in the service providing device has been reduced to the threshold remaining amount or less.

2. The consumables management system according to claim 1,
   wherein the processor of the service providing device is further configured to determine on the service providing device side that the non-zero remaining amount of the consumable item mounted in the service providing device has been reduced to the threshold remaining amount or less,
   wherein the processor of the service providing device transmits consumption information, which indicates that the non-zero remaining amount of the consumable item has been reduced to the threshold remaining amount or less, to the mobile device.

3. The consumables management system according to claim 2, further comprising:
   a rank memory that stores a plurality of mobile device IDs for specifying a plurality of the mobile devices, priorities being set for the plurality of mobile device IDs,
   wherein the processor of the service providing device tries transmission of the consumption information, which is based on the determination of the processor of the service providing device and indicates that the non-zero remaining amount of the consumable item has been reduced to the threshold remaining amount or less, to each of the plurality of mobile devices whose IDs are stored in the rank memory in a sequential manner according to the priorities stored in the rank memory.

4. The consumables management system according to claim 3,
   wherein the processor of the service providing device determines the non-zero remaining amount of the consumable item mounted in the service providing device for each of a plurality of different threshold remaining amounts,
   wherein a response indicating whether or not there is an intention to execute recovery of consumption of the consumable item is received by the mobile device after the notification processor sends notification, which indicates that the non-zero remaining amount of the consumable item has been reduced to one threshold remaining amount or less among the plurality of threshold remaining amounts,
   the mobile device side transmits the response to the processor of the service providing device, and
   for at least one preliminary threshold remaining amount from a largest remaining amount among the plurality of threshold remaining amounts, in a case where the response received by the processor of the service providing device is a response indicating that there is an intention to execute recovery of consumption of the consumable item with respect to transmission of consumption information indicating that the non-zero remaining amount has been reduced to the preliminary threshold remaining amount or less to the mobile device, the processor of the service providing device stops transmission of the consumption information, which indicates that the non-zero remaining amount has been reduced to the preliminary threshold remaining amount or less, to all target mobile devices including the mobile device that has sent the response.

5. The consumables management system according to claim 2, wherein the processor of the service providing device determines the non-zero remaining amount of the consumable item mounted in the service providing device for each of a plurality of different threshold remaining amounts, wherein a response indicating whether or not there is an intention to execute recovery of consumption of the consumable item is received by the mobile device after the notification processor sends notification, which indicates that the non-zero remaining amount of the consumable item has been reduced to one threshold remaining amount or less among the plurality of threshold remaining amounts, the mobile device transmits the response to the processor of the service providing device, and for at least one preliminary threshold remaining amount from a largest remaining amount among the plurality of threshold remaining amounts, in a case where the response received by the processor of the service providing device is a response indicating that there is an intention to execute recovery of consumption of the consumable item with respect to transmission of consumption information indicating that the non-zero remaining amount has been reduced to the preliminary threshold remaining amount or less to the mobile device, the processor of the service providing device stops transmission of the consumption information, which indicates that the non-zero remaining amount has been reduced to the preliminary threshold remaining amount or less, to all target mobile devices including the mobile device that has sent the response.

6. The consumables management system according to claim 1, wherein the processor of the service providing device transmits consumption information, which indicates the non-zero remaining amount of the consumable item mounted in the service providing device, to the mobile device, and the mobile device is further configured to determine that the non-zero remaining amount of the consumable item has been reduced to the threshold remaining amount or less based on the consumption information, which is received by the mobile device and indicates the non-zero remaining amount of the consumable item mounted in the service providing device.

7. The consumables management system according to claim 6, further comprising:

a threshold value memory that is mounted in the mobile device to store a threshold remaining amount set for each mobile device, wherein the mobile device determines that the non-zero remaining amount of the consumable item mounted in the service providing device has been reduced to the threshold remaining amount or less stored in the threshold value memory.

8. A consumables management device, comprising:

a processor configured to determine a non-zero remaining amount of a consumable item mounted in a service providing electronic device, in which a consumable item whose consumption is recoverable by replacement or replenishment is mounted and which provides a service accompanying consumption of the consumable item, has been reduced to a predetermined threshold remaining amount or less, and transmit consumption information, which indicates that the non-zero remaining amount of the consumable item has been reduced to the threshold remaining amount or less, to a mobile device possessed by an administrator present within a communication area set in advance corresponding to the service providing electronic device in a sequence listed in an administrator list starting from an administrator having highest priority.

* * * * *